US008162650B2

(12) United States Patent
Roemer et al.

(10) Patent No.: US 8,162,650 B2

(45) Date of Patent: Apr. 24, 2012

(54) FILLING APPARATUS FOR A ROTARY TABLET PRESS

(75) Inventors: Harald Roemer, Reinbek (DE); Jan Naeve, Schattin (DE); Matthias Dederichs, Hamburg (DE); Wolfgang Soltau, Neu Darchau/Katemin (DE); Ulrich Arndt, Lauenburg (DE)

(73) Assignee: Fette GmbH, Schwarzenbek (DE)

( * ) Notice: Subject to any disclaimer, the term of this patent is extended or adjusted under 35 U.S.C. 154(b) by 662 days.

(21) Appl. No.: 12/263,509

(22) Filed: Nov. 3, 2008

(65) Prior Publication Data

US 2009/0142437 A1 Jun. 4, 2009

(30) Foreign Application Priority Data

Nov. 30, 2007 (DE) ........................ 10 2007 057 789

(51) Int. Cl.
*B29C 43/08* (2006.01)

(52) U.S. Cl. ......................... 425/256; 425/345; 425/261

(58) Field of Classification Search .................... 425/78, 425/345, 256, 261; 141/71-74
See application file for complete search history.

(56) References Cited

U.S. PATENT DOCUMENTS 2,737,289 A * 3/1956 Peters .......................... 198/570
3,978,640 A * 9/1976 Crossley et al. ................ 53/468
4,475,880 A * 10/1984 Crossley et al. .............. 425/353
6,068,465 A * 5/2000 Wilson .......................... 425/193
7,210,507 B2 * 5/2007 Facchini ....................... 141/146
2003/0124183 A1 7/2003 Sowden

FOREIGN PATENT DOCUMENTS

DE 818450 10/1951
FR 1276488 11/1961

* cited by examiner

*Primary Examiner* — Richard Crispino

*Assistant Examiner* — Thukhanh Nguyen

(74) *Attorney, Agent, or Firm* — Vidas, Arrett & Steinkraus P.A.

(57) ABSTRACT

A filling apparatus for a rotary tablet press, which itself being arranged stationarily is associated to a circulating die plate of a rotor of the tablet press, with a filling chamber, which features an upper inlet opening for powder-shaped compression material and a filling opening aligned with die bores of the die plate, and with a conveying means in the filling chamber driven by a drive motor, wherein the filling chamber is circular, one single disc-shaped filling wheel is rotatably mounted around a vertical axis in the filling chamber, which has plural wings on the perimeter, spaced apart in the perimeter direction, which sweep over the filling opening upon rotation of the filling wheel, and the inlet opening is arranged in a distance above the filling wheel, preferably approximately centered with the axis of the filling wheel.

14 Claims, 3 Drawing Sheets

FILLING APPARATUS FOR A ROTARY TABLET PRESS

CROSS-REFERENCE TO RELATED APPLICATIONS

Not applicable

STATEMENT REGARDING FEDERALLY SPONSORED RESEARCH

Not applicable

BACKGROUND OF THE INVENTION

The present relation is related to a filling apparatus for a rotary tablet press. When the term “tablet press” is used in the following, then the same relates generally to a rotary press which presses powder shaped material together into pressed articles. These have not always to be tablets.

The typical construction of a rotary press is such that a rotor driven by a drive motor contains a die plate with die bores, as well as guides for upper and lower punches, which are actuated by radial cams and compression rollers, in order to co-operate with the powder material in the die bores. With die bores, passage openings in the die plate are meant, which are formed either by die inserts or by simple bores in the die plate or in segments of the die plate, respectively. The filling of the die bores takes place with the aid of a suitable filling apparatus, which is stationarily associated to the perimeter of the die plate. The filling opening of a chamber of the filling apparatus is associated to the pitch circle of the die bores. When the die bores pass below the filling opening, they are consecutively filled with the powder shaped material. In this, the lower punch is in each case arranged in the inside of the die bore, and with its position it determines the volume of the material to be compressed which is taken up by the die bore.

Different constructions for filling apparatuses have become known. In principle, they differ in that whether they supply the compression material to the die bores solely by gravitation, or whether they have a suitable conveying—or agitating means, respectively, in order to supply compression material fed into the chamber of the filling device efficiently to the die bores.

Filling via gravitation (with a chamber feed shoe) transports the compression material gently to the die bores. The filling of the die bores takes place via falling down of the powder into the die bores caused by gravitation. From on a certain speed of the rotor, such a filling apparatus does no more work with the necessary filling constancy.

When there is an agitation device in the chamber of the filling device, the same conveys the compression material to the die bores by mechanical scooping. This principle works reliably even at high speeds of the die plate. Admittedly, the powder shaped compression material is strongly stressed by the shear forces occurring in the scooping. In addition, demixing or destruction of the compression material may take place. A further disadvantage may be the fluctuating course of the pressure in the flow of the compression material, which is caused by strong deflections in the interior of the filling apparatus. Further, the sumptuous cleaning is disadvantageous.

The present invention is based on the objective to provide a filling apparatus for a rotary tablet press, which works reliably even at high speeds, treats the compression material with care at the same time and is easy to clean.

In the present invention, one single filling wheel is mounted in the chamber, which is rotatable around a vertical axis. The chamber is circular in the region of the rotation of the filling wheel, and can be formed circularly even above the filling wheel. Yet, it is also possible to block up this region outside of the filling opening, in order to form only a narrow flow section.

On its perimeter, the filling wheel has plural wings, spaced apart in the perimeter direction, which sweep over the filling opening in the rotation of the filling wheel. The inlet opening is arranged preferably approximately centred with the axis or near to the axis of the filling wheel, in a distance to the same.

In the filling apparatus of the present invention, the advantages of conventional constructions are combined. There is a gently material supply to the die bores even at high speeds. In addition, the filling apparatus of the present invention can be cleaned easily. Through its simple construction and the small number of assembly parts, the filling apparatus of the present invention can be cleaned manually as well as automatically without greater expenditure. Through this, cleaning- and setup times at for instance product changes are shortened. Demixing of individual substances of the compression material is minimised. Any mechanical load is avoided in a great extent. Pressure variations on the flow path for the compression material are also minimised.

In the filling apparatus of the present invention, the compression material supplied from the topside to the filling wheel, centrally for instance, is directed towards the side, which can take place particularly efficiently when the upper side of the filling wheel is formed conically in particular, so that the compression material is directed radially towards the outside after entering in the filling chamber. For instance, an efficient deflection may be achieved even in that the upper side of the filling wheel is helical. By the way, the upper side may even be realised to be smooth, or it may have a suitable condition of the surface.

In one embodiment of the present invention, the filling opening is lengthened to a bow-shaped channel (pre-filling channel) in the bottom of the filling chamber, which is aligned to the pitch circle of the die bores and which extends beyond the filling chamber opposite to the rotational direction of the die plate. The pre-filling channel is preferably open at its end. The compression material is therefore carried into the individual die bores via a longer path, wherein the die bores which enter below the pre-filling channel are at first partly filled via a gravitational filling, until they are subsequently completely filled up below the filling chamber, up to the upper edge of the die plate.

Another embodiment of the present invention provides that the lower surface of the filling wheel, situated radially inside of the wings, runs approximately plane parallel to the bottom of the filling chamber, and that the lower surface has at least one preferably helical bridge. The bridge prevents that compression material intrudes into the gap between the filling wheel and the bottom of the filling chamber and affects the operation of the filling wheel, when it arrives at the driving shaft of the filling wheel.

According to a further embodiment of the present invention, the drive of the filling wheel takes place via a central shaft, which is guided through the bottom of the filling chamber. It is provided with a suitable drive motor.

The wings in the filling wheel of the present invention are finger-like and extend approximately up to the circular side wall of the filling chamber. The finger-like wings are significantly smaller in their width than the spacing of the wings from each other. Their length is such that they sweep essentially only the region of the die bores.

According to a further embodiment of the present invention, the casing of the filling device of the present invention constructionally consists essentially only of a bottom plate and a cover plate, which form the filling chamber together, wherein the cover plate is preferably conical.

BRIEF DESCRIPTION OF THE SEVERAL VIEWS OF THE DRAWINGS

The present invention is explained in more detail in the following by means of drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
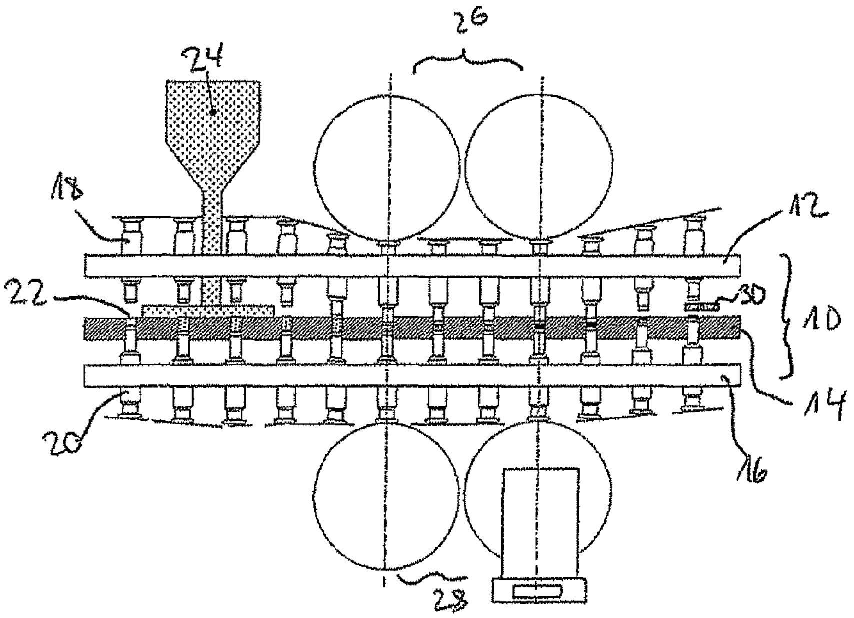
FIG. 1 shows the developed view of a rotor of a rotary tablet press on the pitch circle of the die bores.

A rotor 10 of a tablet press is depicted in FIG. 1 by an upper disc 12, a die plate 14 and a lower disc 16. The upper disc 12 serves for the guiding of upper punches 18, and the lower disc serves for the guiding of lower punches 20. Die bores 22 are provided in the die plate 14, which are situated on a pitch circle of the die plate, as this is per se known. Upper and lower punches 18, 20 co-operate with the die bores. A filling apparatus is assigned to the die plate 14, via which the die bores 22 are filled with a suitable compression material, the lower punches being situated in the die bores 22 in this. Thereafter, upper and lower compression rollers 26 and 28, respectively, provide for the compression of the compression material in the die bores 22, as the punches are driven farther into the die bores. When they are behind the compression rollers 26, 28, the upper punches 18 are lifted again, so that the pressed articles can be ejected out of the die bores 22 by lower punches 20 and can be stripped off by a stripping device 30. Such a construction or such a function, respectively, of a rotary tablet press is per se known. In FIG. 2 to 5, the filling apparatus 24, which is drawn in FIG. 1 as a symbol only, is depicted in more detail.

A filling plate 32 and a conical ceiling part 34, which is fixed on the filling plate 32, enclose a filling chamber 36. As comes out of FIG. 2 to 4, the filling plate 32 is composed of a first portion 38 and a second portion 40. The first portion 38 is covered up by the ceiling part 34 to a large extent and ends in a step 42 in a distance to the die plate 14, wherein the curvature of the step 42 is essentially corresponding to the curvature of the die plate 14. The step 42 is followed by the portion 40, which has a smaller thickness than the portion 38. The portion 40 has the shape of a circle segment and extends above the die plate 14, with a very small distance to the same. In turn, the curvature of the portion 40 corresponds to the curvature of the die plate. As comes out from FIGS. 4 and 5 in particular, a bow-shaped channel 44 is shaped in into the portion 40, which is directed towards the pitch circle of the die bores 22. When the die bores 22 move in the direction of arrow 46, they run therefore below the channel 44. Outside of the filling chamber 36, the channel 44 extends opposite to the rotational direction 46 in the portion 40. Opposite to the rotational direction of the die plate 14, the channel 44 is formed openly.

The bottom of the filling chamber 32, which is directed towards the filling chamber 36, is planar. On the edge, there is a circumferential flange 48. The conical ceiling part 34 has a conical portion 50, which passes radially towards the outside into a disc-shaped portion 52, which is screwed together with the flange 48. Radially at the inside, a ring portion 54 is formed on the conical portion 50.

A filling wheel 56 is arranged in the filling chamber 36, which has a coniform portion 58 and radial, finger-shaped wings 60 on that part of the conical portion 58 which is situated radially at the outer side. The conical portion 58 is centrally connected to a shaft 62, which on its part is in connection with a not shown drive motor. The conical portion 58 is centrally directed towards the ring portion 54, which forms an inlet opening 64 to the chamber 36 for powder material. The cone angle of the conical portion 58 is somewhat smaller than the cone angle of the conical portion 50 of the ceiling part 34, so that the chamber gradually tapers radially towards the outside. The finger-like wings 60 extend into the radially outer region of the chamber 36, which is only a little bit higher than the height of the finger-like wings 60.

Figure 2:
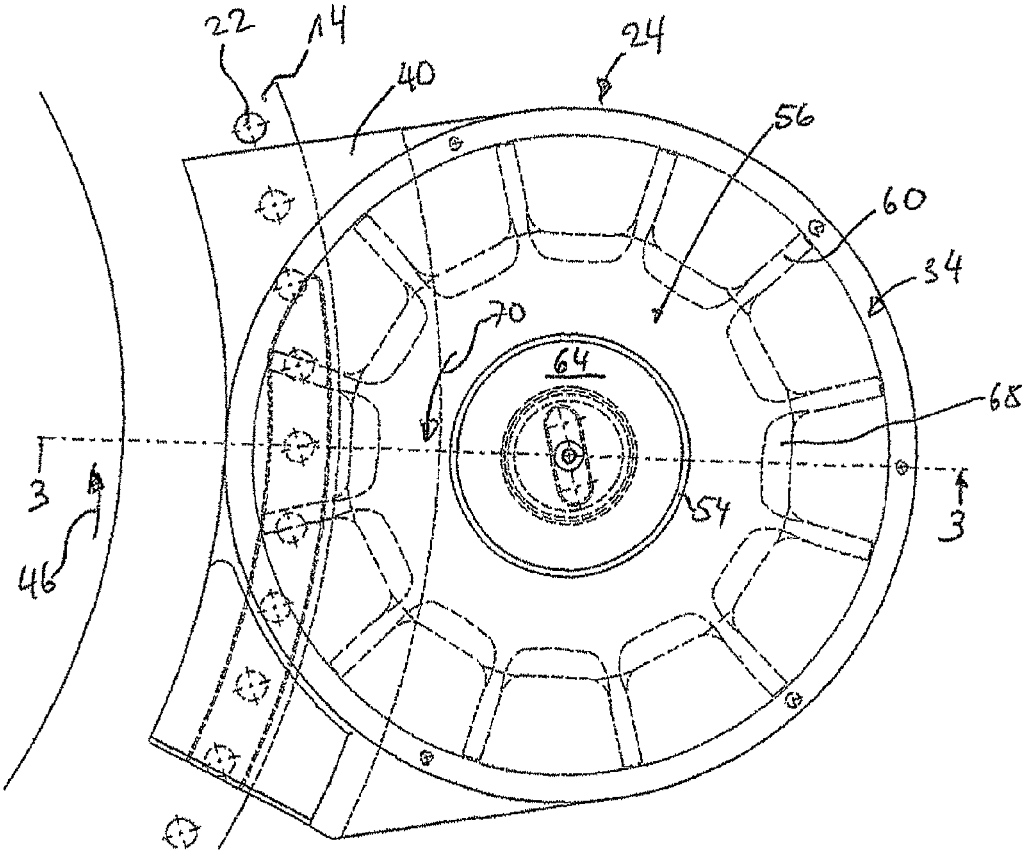
FIG. 2 shows a top view on the filling apparatus of the present invention.

As can be recognised from FIG. 2 in particular, the finger-like wings 60 are relatively narrow and extend approximately up to the radially outer cylindrical wall of the filling chamber 36. The spacing between the finger-like wings 60 is plural times the width of the fingers 60. The transition from the conical portion 56 into the region between the finger-like wings 60 is also conical, as indicated at 68 in FIGS. 2 and 3.

Figure 3:
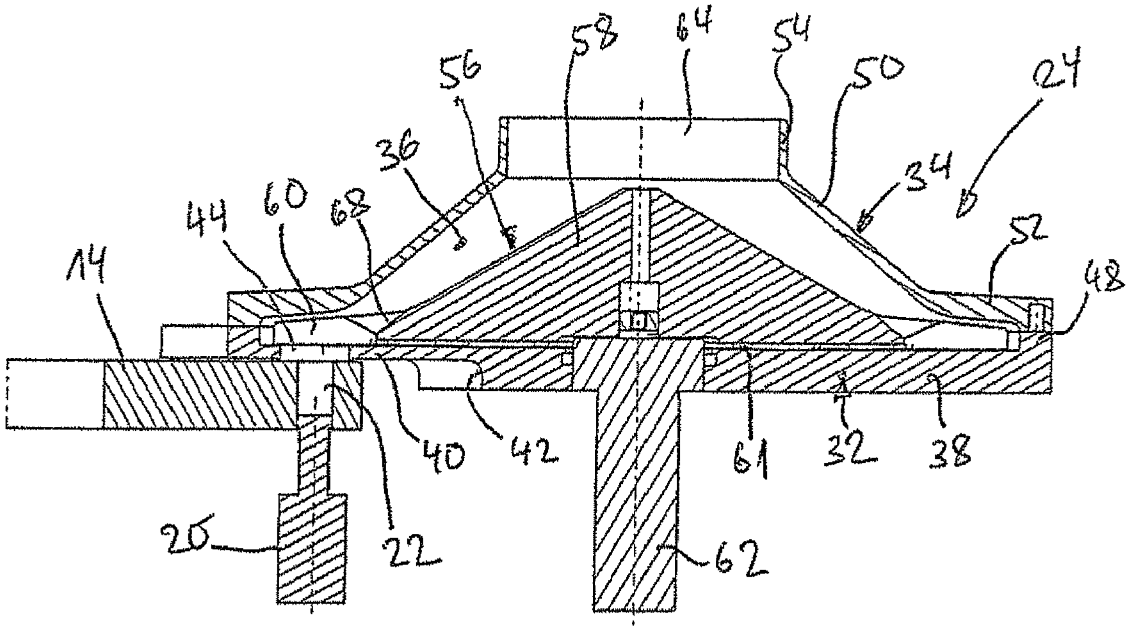
FIG. 3 shows a cross section through the depiction after FIG. 2, along the line 3-3.
Figure 4:
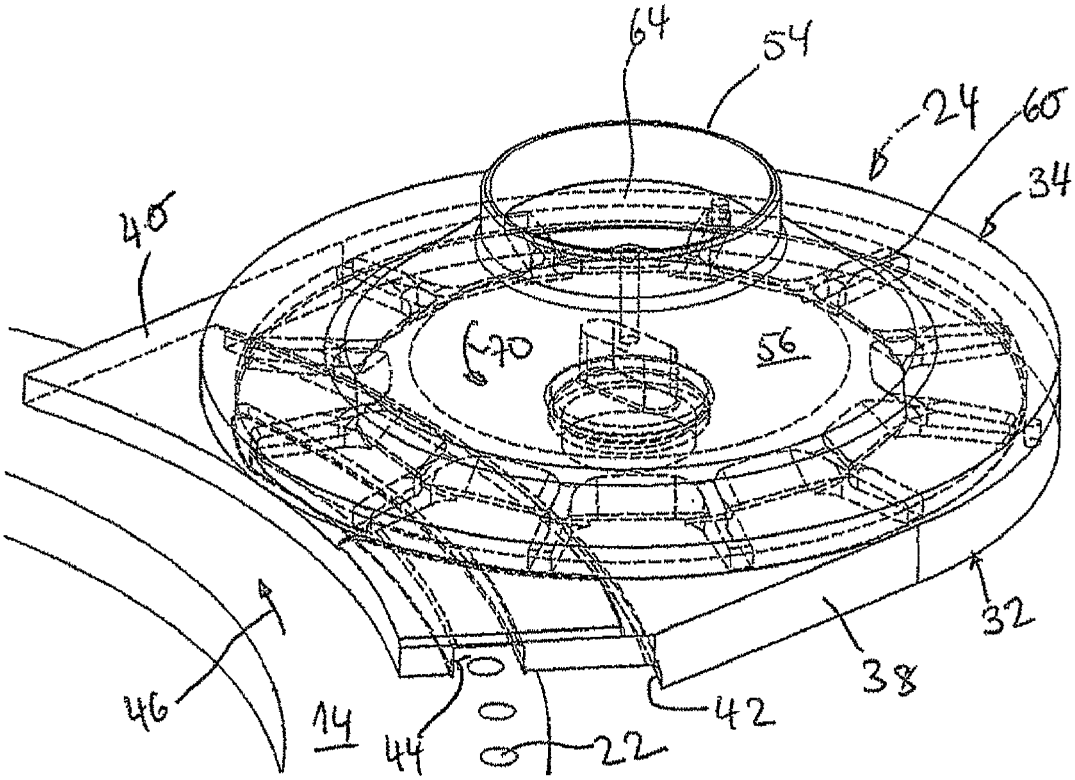
FIG. 4 shows a top view on the filling apparatus after FIG. 2 in a perspective view.
Figure 5:
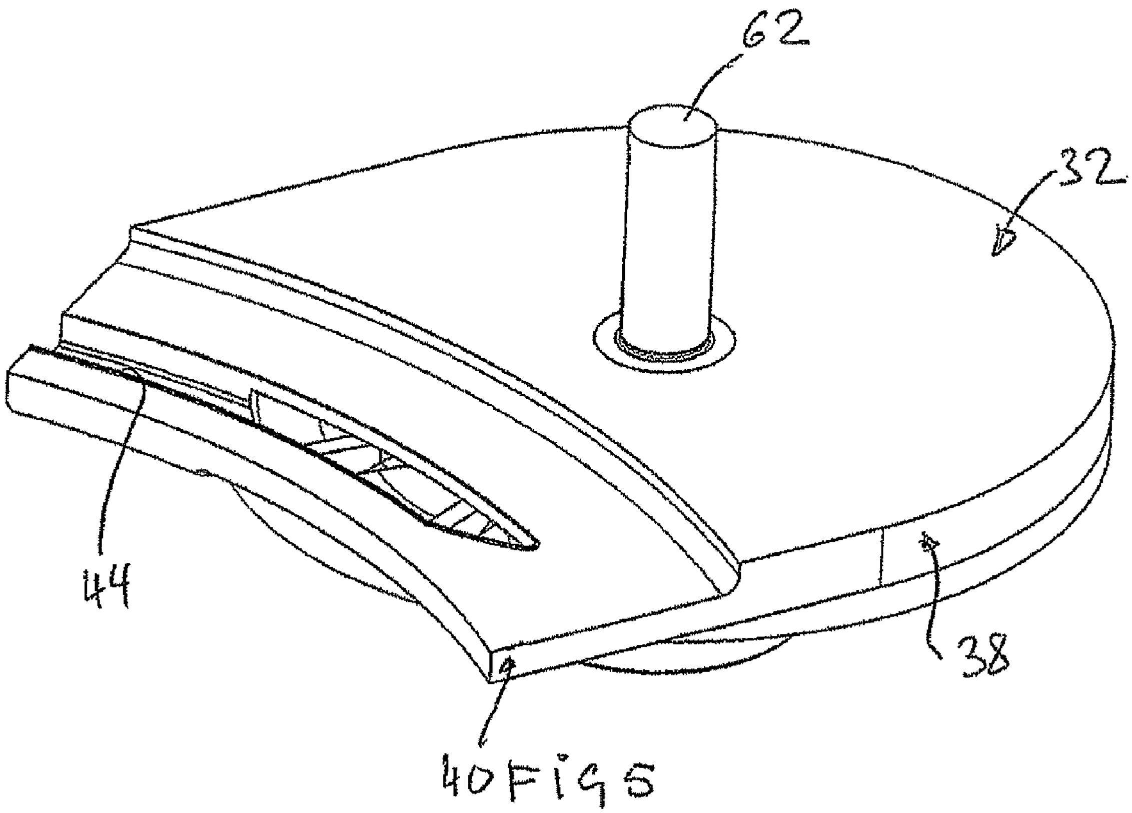
FIG. 5 shows the bottom view of the filling apparatus after FIG. 2 to 4.

As can be recognised in FIGS. 2 and 3 in particular, the wings 60 extend essentially across the region which is occupied by the die bores 22 of the die plate 14.

The compression material arrives in the filling chamber 36 via the inlet opening 64 by gravitation, and it is distributed radially towards the outside along the surface of the conical portion 58 and 68, and in this it is scooped over the die bores 22 by the finger-like wings 22. A part of the compression material arrives also in the channel 44 in this, and due to the movement of the filling wheel 56 it is thrown oppositely to the rotational direction of the die plate 14. The rotational direction of the filling wheel is opposite to that of the die plate 46, as indicated at 70. In this way, there is a pre-filling of the die bores 22, before they are completely filled with compression material below the filling wheel 56.

What is claimed is:

1. A filling apparatus for a rotary tablet press, which itself being arranged stationarily is associated to a circulating die plate of a rotor of the tablet press, with a filling chamber, which features an upper inlet opening for powder-shaped compression material and a filling opening aligned with die bores of the die plate, and with a conveying means in the filling chamber driven by a drive motor, characterized in that one single filling wheel (56) is rotatably mounted around a vertical axis in the filling chamber, which has plural wings (60) on the perimeter, spaced apart in the perimeter direction, which sweep over the filling opening upon rotation of the filling wheel (56), and that the inlet opening (64) is arranged in a distance above the filling wheel (56), centered with the axis of the filling wheel (56), and that a distance is provided between the filling wheel (56) and an upper wall of the filling chamber (36) at least in the segment assigned to the filling opening, in order to form a flow channel portion wherein the filling opening is lengthened to a bow-shaped channel (44) in the bottom of the filling chamber, which is aligned to the pitch circle of the die bores (22) and which extends beyond the filling chamber (36) opposite to the rotational direction of the die plate (14), and which forms a pre-filling channel (44) outside of the filling chamber (36) and wherein the pre-filling channel (44) is open at its end.

2. A filling apparatus according to claim 1, characterized in that the lower surface of the filling wheel (56) situated radially inside of the wings (60) runs plane parallel to the planar bottom of the filling chamber (36), and that the lower surface has at least one coaxial, helical bridge (61).

3. A filling apparatus according to claim 1, characterized in that the filling wheel (56) is connected to a central shaft (62), which extends through the bottom of the filling chamber (36).

4. A filling apparatus according to claim 1, characterized in that the wings are finger-like and extend approximately up to the circular side wall of the filling chamber (36).

5. A filling apparatus according to claim 1, characterized in that the wings (60) have a radial length through which they extend essentially across the region of the die bores (22).

6. A filling apparatus according to of claim 1, characterized in that the upper side of the filling wheel (56) is flat.

7. A filling apparatus according to claim 1, characterized in that the upper side of the filling wheel (56) is helical.

8. A filling apparatus according to of claim 1, characterized in that the upper side of the filling wheel (56) is conical inside the wings (60).

9. A filling apparatus according to claim 8, characterized in that the upper wall of the filling chamber (36) is also conical (50) in the region of the conical portion (58) of the filling wheel (56) and approximately parallel to the cone surface of the filling wheel portion (56).

10. A filling apparatus according to claim 9, characterized in that the circular central inlet opening (64) passes into the chamber wall steadily.

11. A filling apparatus according to claim 1, characterized in that the height of the filling chamber (36) in the radially outer portion of the wings (60) is only marginally greater than the height of the wings (60).

12. A filling apparatus according to claim 4, characterized in that the filling wheel (56) is also conical (68) in the region between the wings (60).

13. A filling apparatus according to claim 1, characterized in that the filling chamber is formed by a bottom plate (32) and a cover plate (34), wherein the cover plate (34) is funnel-shaped.

14. A filling apparatus according to claim 2, characterized in that the filling wheel (56) is connected to a central shaft (62), which extends through the bottom of the filling chamber (36).

* * * * *